Aug. 17, 1965     D. C. McNEIL     3,200,568

FLASH SEPARATOR

Original Filed Nov. 7, 1960

INVENTOR.
DALPH C. McNEIL

BY Green, McCallister & Miller

ATTORNEYS

United States Patent Office 3,200,568
Patented Aug. 17, 1965

3,200,568
FLASH SEPARATOR
Dalph C. McNeil, 43 Pine St., Brookville, Pa.
Continuation of application Ser. No. 67,813, Nov. 7, 1960.
This application Sept. 6, 1963, Ser. No. 307,266
5 Claims. (Cl. 55—191)

This is a continuation of my application Serial No. 67,813, filed Nov. 7, 1960, and entitled "Flash Separator" which has been abandoned in favor of the present application.

This invention relates to improvements in blow-down separators such as shown in applicant's prior patent No. 2,762 451, issued on September 11, 1956, for separating velocity flow materials of different densities that are introduced thereto as a flow stream and particularly, to an improved separator suitable for processing a blow-down discharge from boilers or pressure vessels.

Make-up water supplied to pressure vessels contains solids, concentrates, and dissolved materials which tend to deposit the boiler heating surfaces and to cause corrosion. It is thus important to reduce this action by frequent blow-downs. In some installations, a continuous blow-down may be employed and, in which event, separated flash is recirculated back to the system or vessel. A separator is used since it is not permissible to blow directly from a vessel into the sewer system, particularly in view of the high temperatures and pressures of the blow-down.

Due to the present-day tendency to employ higher pressures in the blow-down and attendant higher temperatures and to require the separation out of a much purer flash which may be vented to the atmosphere or returned to the system, there has been and urgent need for separating apparatus that will not only handle higher temperatures and pressures and effectively reduce them to lower values, but which will provide a more effective separating action as to the through-put.

It has been an object of my invention to devise a new and improved blow-down sparator which will meet the present day more stringent requirements without the necessity of, for example, employing multiple units;

Another object has been to provide a separator which will assure a vented portion of maximized purity to meet stringent zoning requirments as to waste discharges into the atmosphere;

A further object of my invention has been to provide an apparatus which, as a single unit, will effectively reduce high blow-down pressures to minimize drain discharge pressures and which will, at the same time, minimize the temperature of the drain discharge;

These and other objects of my invention will appear to those skilled in the art from the illustrated embodiment, the dscription, and the claims.

Figure 1:
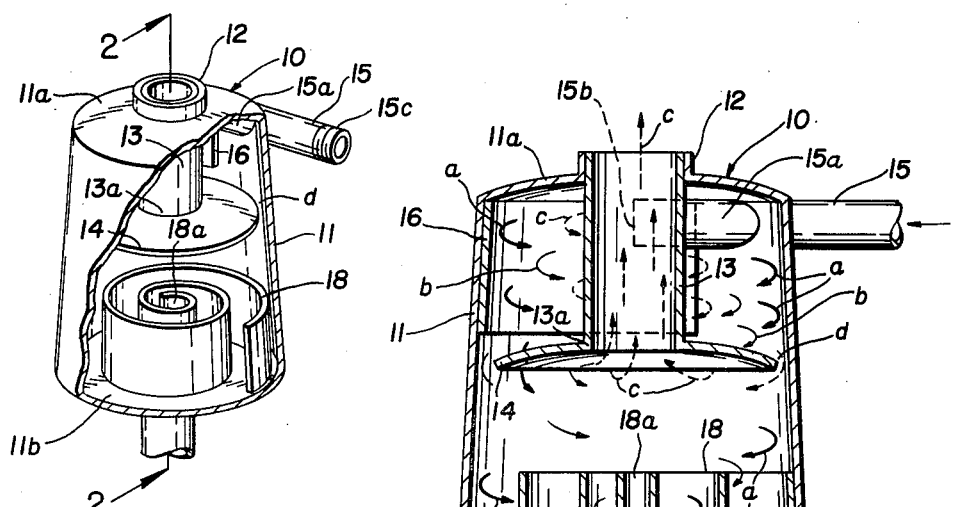
FIGURE 1 is a perspective view in elevation and partial section of a blow-down separator constructed in accordance with my invention.

In carrying out my invention, I have devised a separator unit 10 which is quiet in its action, is self-cleaning and draining, and which provides an improved type of separator action, such that a maximum of and only substantially pure flash or steam is vented therefrom. The blow-down fluid is introduced tangentially from a pressure vessel by connection to a threaded end 15c of an inlet pipe 15 that extends through a side wall 11 of the unit and has a short-length portion 15a that is open or has a port 15b at its end and that extends along the inside of such side wall to introduce the fluid to be conditioned. The inward extension of the portion 15a is important in imparting an improved centrifugal action to the velocity fluid being introduced. It will be noted that inlet port 15a is located near the top of a separating and conditioning chamber whose diameter is preferably less than its height and whose height is divided into upper and lower, substantially segregated, primary and secondary chambers by an intermediate or separating, self-draining, disc-like baffle member 14. The baffle 14 is carried by the lower end portion of a centrally-disposed, tubular, vertical, vent or discharge pipe 13 whose inlet opening or port portion is open fully and centrally from the under side of the baffle.

The enclosed separating and conditioning chamber is defined by an enclosing wall having a rounded or curvilinear vertical or side wall portion 11 that may be of somewhat frusto-conical or cylindrical shape and that, if of the former, diverges towards its bottom end portion. The enclosing wall has inwardly-concave or dish-shaped top and bottom or end wall portions 11a and 11b. The entering blow-down fluid enters as a velocity flow about a circular, upper heat and corrosion-resistnat inner quadrant member 16 into the primary chamber in a centrifugally induced path, about a continuous cylindrical wall of the upright vent or discharge tube member 13, and downwardly towards the secondary chamber that lies beneath the baffle 14. It will be noted that the wall of the discharge member 13 defines the inner periphery of the upper chamber and is substantially continuous and of uniform diameter.

During this time, the fluid flow, by reason of its centrifugal action, is separated into portions which may be represented by an outer portion $a$ of a maximum density, viscosity or entrainment of condensates, an intermediate portion $b$ which also contains fluid or flash and is of intermediate density, and an extreme inner or low density portion $c$ which is substantially pure steam or flash. As the flow continues, flash explosion takes place. These representative portions $a$, $b$ and $c$, flow as somewhat segregated, circular or spiral layers downwardly towards the separator baffle 14, with the substantially pure portion $c$ as the innermost layer. This innermost layer $c$, moves downwardly closely along the outer surface of the vent pipe 13, closely along the upper convex surface of the baffle 14, over its downwardly-sloped peripheral or circumferential edge, loses its spiral or tangent spin, then moves abruptly or acutely-radially underneath and closely along the under or concave surface and within the concave chamber of the baffle 14, and, with volume expansion or venturi action, directly into the opening or port of the open bottom end portion 13a and out of the centrally-positioned discharge or vent member 13.

The confined and close surface relationship of the pure portion $c$ with respect to the surfaces of the baffle 14 and the abrupt flow change provide a further flashing and separating action that gives a final acute change in direction and maximum purity of the portion $c$, as it is vented. Residual fluid and the portion of intermediate density or viscosity of some contamination $b$, and the portion of maximum contamination, density or viscosity $a$, in the centrifugal flow, move downwardly through circumferential passageway portion $d$, into the lower chamber, and are directed by an upright spiral baffle 18 into its relatively wide outer opening (see FIGURE 1) that faces in the direction of the flow. The fluid portions *a* and *b* then move in a guided relationship along a spiral, inwardly-converging path defined by the baffle 18, towards its inner end portion 18*a*, and downwardly-outwardly through a centrally-disposed, bottom drain pipe 19. By sloping all the internal parts of my unit towards the drain 19, I make possible a quick drying-out of its interior, as aided by the heat imparted by a previous blow-down operation.

Employing the principle of this improved apparatus, I have found that higher pressures of fluid may be handled by merely increasing the height of the upper and lower portions of the chamber, such that a maximum of flashing action is accomplished and a maximum of volume expansion and flash is provided. Although pressure and temperature reduction of the fluid is accomplished in both the upper and lower chambers, the maximum reduction is effected in the lower chamber.

By way of example, I have found that the separating or intermediate baffle 14 may be located about ¼ to ½ the height of the conditioning chamber from the top closure or end wall 11*a* of the unit 10, with larger size units having it located about ⅓ to ½ the distance; for example, for a pressure of 600 pounds p.s.i., the distance may be ½. The passage area *d* between the outer edge of the separator baffle 14 and the inner peripheral wall 11 of the unit must always be larger than the area of the top vent opening as well as of the bottom drain opening, as represented by the inner diameters of the pipes 13 and 19. Such spacing proportioning is important from the standpoint of avoiding a build-up of fluid pressure while, at the same time, providing a high velocity for most effective entrainment and centrifugal action.

Referring particularly to the drawings, 10 embodies my separator unit having a vertical or upright, substantially smoothly-curved or rounded side wall 11 that define an inner bounding area for the chamber. The inverted top or downwardly-concave, dish-shaped end wall 11*a* closes off the upper end of the upright wall 11 and has a centrally-disposed and upwardly-projecting vent connection 12 into which the vent or discharge pipe or member 13 extends. The vent connection 12 may be connected to the atmosphere through the roof of the plant or may be connected back to the boiler system when the clean, vented, gaseous fluid is to be re-utilized. The lower end of the wall 11 is closed by the upwardly-concave, dish-shaped end portion 11*b* which carries the centrally-disposed and downwardly-extending vent pipe 19.

The inlet pipe 15 has an open or delivery end port 15*a* positioned so as to provide a tangential flow along the inner surface of the extreme upper portion of the wall 11 and directly upon the striking plate quadrant 16 of stainless steel which extends along the wall 11. The entering blow-down is thus given an initial volume expansion as it enters the upper, primary or separating portion of the chamber and is moved in a centrifugal manner such that its heavier fluid materials (including condensate), by reason of their density, tend to move outwardly and materials of lower density tend to hug a central portion of the chamber and particularly the inner surface of the vent outlet pipe or cylindrically-shaped wall 13 which is of uniform diameter and projects from within the vent connector 12 vertically-downwardly to and is fully open as to its diameter at its lower end.

The downwardly-outwardly sloped, intermediate separator baffle 14 which is shown of inverted dished shape, has an opening at its central portion corresponding to the adjacent inner diameter of the vent wall 13 and is a smooth and uninterrupted part thereof to project from the lower end of such wall outwardly to define the circumferential spacing *d*. This enables the fluid portion *c* to freely move without restriction through the discharge member 13.

The separator baffle 14, by reason of its downwardly-radially-outwardly sloped relationship, and the vent wall 13, by reason of its continuous, closed or solid relationship adjacent such baffle, produce an improved separating action, such that the released flash, steam or vapor discharged from the vent or discharge member 13 is substantially pure. This discharge may be in the neighborhood of 12 to 15% of the blow-down introduced in lower pressure utilizations wherein the fluid is introduced at a pressure of about 100 pounds per square inch. The construction is also such that the contaminated portions of the blow-down are silently moved under high velocity in a spiral path through the opening *d* down to the lower or secondary chamber portion, where their pressure and temperature are further reduced, and then enter the exit course of the spiral baffle 18. The volume increase of the flash may be in the neighborhood of about 200 times its volume in the primary chamber.

Figure 3:
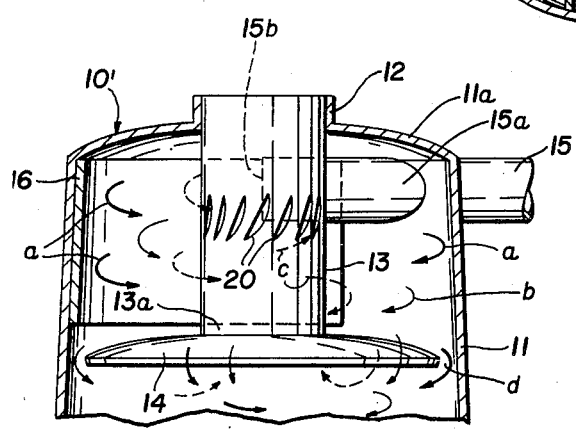
FIGURE 3 is a fragmental vertical section through an upper portion of a modified construction which is suitable for much higher pressure applications; this view is slightly enlarged with respect to FIGURE 2.

The baffle 18 is secured to project upwardly from the inside of the bottom end wall 11*b* and is shaped, so that its wider and open mouth inlet portion slopes in the direction of the movement of the fluid material, and such that the material is not slowed down in such movement as it flows downwardly and outwardly through the drain opening 19 which may be connected to the sewer.

Where pressures over, for example, 350 to 600 or more pounds p.s.i. are involved, I also contemplate the use of slanted vent, slot or port portions 20 (see the unit 10' of FIGURE 3) in the upper area or portion of the wall 13 to provide a venturi and additional venting action for the vapor part of the flow which, by a bleeding or venting action relieves pressure, but without materially decreasing the improved separating action of my present invention. In this way, I can process higher pressure fluids to minimize the need for enlarging the size of the upper and lower chambers.

It will be noted that the circumferentially-spaced, slotted portions 20 have a planar base with a slight upward cant in the direction of spiral flow and have a curved opposed face and are preferably substantially equally spaced about the periphery of the upper portion of the wall 13. Their shape and positioning is such as to reject more dense portions or fluid of the flash flow. It is important that they be located in a spaced relation above the baffle wall 14, or a minimum of approximately ½ of the length of the vent wall 13 that lies within the upper or primary chamber, to assure my improved separating action.

Less entrainment and a maximum separation is provided in my present construction, such that a maximum of liquid and more dense material, with its flash and pressure having been released, is discharged through the drain 19. The pressure drop action, by way of example, for a flow introduced at about 100 pounds pressure at 300° F., is such that the drain discharge has a pressure of 5 pounds or less, and this may be retained for higher fluid pressures and temperatures by lengthening the height extent of the upper and lower portions of the chamber and, in the case of extremely high pressures, by the use of the slotted auxiliary vent openings 20. The slots 20 are so shaped that they only accept portions of the pure, highly-vaporized flash part *c* of the flow.

The spacing *d* between the separator baffle 14 and the wall 11 is important from the standpoint of avoiding a build-up of pressure while, at the same time, retaining a velocity of movement sufficiently high for effective deentrainment and centrifugal separation. For example, this distance *d* may vary from about 1½ inches for a unit of about 56 inches in height, to about 1 inch for a unit 10 of about 20 to 34 inches in height, to above ¾ of an inch for a unit of about 16 inches in height. The average inner diameter of the chamber may be in the neighborhood of from 8 to 16 inches for units of heights from 16 to, for example, 56 inches and where the diameter of the drain 19 varies from about 1½ to 5 inches or more. The diameter of the top vent or discharge wall 13 should be always greater than that of the drain pipe 19 and, for example, may vary between about 2½ to 10 inches or more. Also, the diameter of the inlet pipe 15 should be smaller than the diameter of the bottom drain opening or pipe 19, for example, of about ¾ to 2½ inches. Further, by way of example, I have successfully employed smaller separator units 10 having about an average inside diameter of 8 inches and total inside height of 20 inches, of 10 inches diameter and 16 inches height, and of 12 inches diameter and 16 inches height.

I have discovered that an improved effectiveness and quantity of flash recovery is made possible by the employment of a non-restrictive, top vent port that is fully open centrally underneath the baffle 14, by the sharper cut-off action of a separating baffle 14 having a downwardly-turned or sloped outer circumferential edge, and by restricting the use of any side vent openings in the top vent or discharge tube wall 13 and to those essentially having a spaced relation above the separating baffle 14.

Figure 4:
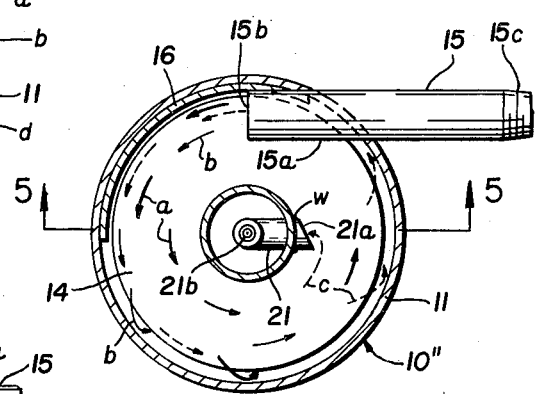
FIGURE 4 is a top plan view on the scale of FIGURE 2 with the top cover removed, showing a modification employing an ejector tube.
Figure 5:
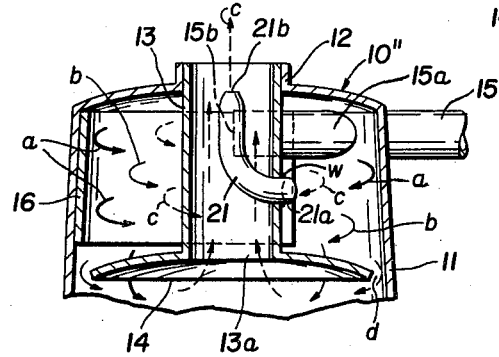
FIGURE 5 is a fragmental vertical section of the modified construction on the same scale as and taken along the line 5—5 of FIGURE 4.

In the construction of FIGURES 4 and 5, an ejector 21, in the nature of a tubular part and nozzle, is positioned to extend substantially centrally-upwardly along the vent or discharge wall 13 and is bent at its lower or inlet end portion 21a to project from and through a vertical side of the vent wall 13 that is remote to (about 270° from) the outlet port 15b of the inlet pipe 15. It will be noted that the inlet portion 21a is positioned below the inlet pipe 15 and has a lip edge which projects slightly from a side thereof which faces the direction of circumferential movement of the flash within the upper chamber. This rejects or prevents entrained liquid that is moving about the outer side of the wall 13 from entering the inlet 21a of the jet or ejector tube 21. The ejector 21 picks-up ready and immediate flash from the incoming liquids and ejects it under increased velocity through its tapered or nozzle outlet end portion 21b. This ejecting action tends to produce a vacuum around the tube 21 and thus increase the normal rate of flow of the flash along the vent wall 13 which enters from the underface of the baffle wall 14. As shown particularly in FIGURE 5, the ejector tube 21 may be secured to the wall 13 by weld metal w. This modified unit has been given the designation 10" to distinguish from the other units; it is otherwise shown the same as the basic unit of FIGURES 1 and 2.

Since the baffle 14 defines a restricted aperture d between the upper and lower chambers, sufficient pressure is maintained within the upper chamber, such that the ready and immediate flash from incoming liquids escapes by virtue of this pressure through the ejector tube 21 and produces greater velocity in the vent 13. This creates a lower pressure in the lower chamber than would normally be accomplished, since gases escaping directly from the ejector tube 21 serve to increase the amount of gaseous flow out along the vent wall 13, thus further reducing the amount of gas introduced into the lower chamber. Also, by lowering the pressure in the lower chamber, a greater volume of gases are given up by the lower chamber liquids to increase the separation efficiency. As a result, there is a reduction of residual and a consequent reduction of residual temperature, particularly as applied to the lower chamber. It is thus possible to reduce the size of the lower chamber to obtain results which are comparable to those of the embodiment of FIGURE 2, or by using the same size of lower chamber, to handle a larger volume of gases with increased efficiency and of higher temperatures and pressures.

Figure 2:
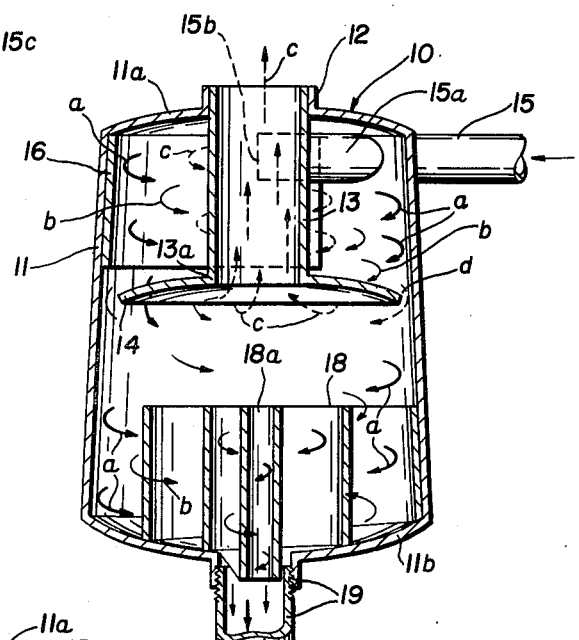
FIGURE 2 is an enlarged vertical view, principally in section, through the separator of FIGURE 1.

In the embodiment of FIGURES 1 and 2, the pressure within the upper and lower chambers may be substantially the same, whereas employing the jet principle of FIGURES 4 and 5, a differential pressure action is effected. It will be noted that the opening or aperture d between the upper and lower chambers provides a restriction, such that directional flow is imparted to the liquids and gases passing about the baffle 14. The liquids continue to travel along the wall 11 and the flash gases tend to turn acutely on or about the baffle 14 to escape out of the vent or discharge wall 13, the same as in the embodiment of FIGURES 1 and 2.

What I claim is:

1. In a quietly operating blow-down separator of the character described that processes contaminated blow-down discharge fluid supplied under positive pressure by a boiler or pressure vessel, a circumferentially-rounded enclosing side wall that extends downwardly, generally inwardly-concave top and bottom closure walls defining an internal chamber with and integrally-secured to said enclosing side wall, an inlet pipe extending through a side portion of the enclosing side wall immediately adjacent said top closure wall and in a tangential relation with said enclosing side wall for introducing contaminated blow-down fluid under positive-pressure tangentially into an upper portion of the internal chamber and inducing a centrigugal downward flow of the fluid within the internal chamber, a tubular flash discharge member having a substantially cylindrical wall projecting centrally-downwardly through siad top closure wall along the upper portion of the internal chamber, said top closure wall fully closing-off the upper portion of the internal chamber from said tubular flash discharge member to said side enclosing wall whereby all fluid moving upwardly out of the internal chamber has to pass through said tubular flash discharge member, an inverted dish-shaped disc-like baffle member, located beneath said inlet pipe, centrally-secured to a bottom end of said discharge member and projecting radially-outwardly therefrom into a radially-inwardly spaced relation with respect to the inner periphery of said enclosing side wall and dividing the internal chamber into an upper contaminated-fluid-receiving chamber and a lower expansion and contaminant collecting chamber, said baffle member having a down-turned outer circumferential edge thereabout defining a circumferential flow-restricting aperture with the inner periphery of said enclosing side wall of a vertical extent that corresponds substantially to the thickness of said edge, said cylindrical wall of said discharge member being closed-off and continuous therealong for at least a substantial upwardly-spaced vertical distance from said baffle member and defining an outlet port portion at its lower end that is fully centrally-open from said cylindrical wall to an under face of said baffle member, a vertically-positioned outlet pipe open at its upper end to said lower chamber and extending downwardly-centrally through said bottom closure wall for discharging contaminated portions of the blow-down fluid from said lower chamber, a spiral baffle positioned within said lower chamber and extending vertically-upwardly from said bottom closure wall and being open vertically-upwardly and horizontally-endwise to said lower chamber for receiving residual denser portions of the fluid and conducting them centrally-inwardly into said outlet pipe; said inlet pipe having an inner end portion positioned and adapted in combination with said top closure, said enclosing side wall, the cylindrical wall of said discharge member and said baffle member to direct the contaminated fluid being introduced under positive pressure in a centrifugal-downwardly moving path along said upper chamber with sufficient velocity to separate the fluid into an outer relatively dense portion, into an intermediate portion of intermediate density, and into an inner lower density portion of substantially pure flash; said baffle member and its said outer circumferential edge being positioned and adapted in combination with the cylindrical wall of said discharge member to direct the inner lower density portion of the fluid over its convex upper face, downwardly over its outer circumferential edge, abruptly and acutely-inwardly over its lower concave side face, and upwardly-out through said outlet port portion and said discharge member without flash restriction in movement from said lower chamber into said discharge member; and said outer circumferential edge being positioned and adapted in combination with said enclosing side wall to impart velocity flow to and pass the outer relatively dense and intermediate density portions of the fluid downwardly along and through said restricted aperture into said lower chamber, and said lower chamber as defined by said enclosing side wall, said baffle means and said bottom closure wall being adapted to expand said portions of the fluid therein and lower their pressure and temperature for discharge through said outlet pipe, said cylindrical wall of said discharge member having an inner flow diameter that is greater than the inner flow diameter of said outlet pipe, and said inlet pipe having an inner flow diameter that is smaller than the inner flow diameter of said outlet pipe.

2. A blow-down separator as defined in claim 1 wherein, said cylindrical wall of said discharge member is fully closed along its length from said baffle member to said top closure wall, and said outer circumferential edge of said baffle member has a radial spacing with respect to the inner periphery of said enclosing side wall within a range of about ¾ to 1½ inches.

3. A blow-down separator as defined in claim 1 wherein, said inlet pipe has an inner end portion that projects tangentially-inwardly through the side portion of said enclosing side wall into said upper chamber, and a corrosion-resistant circular striking plate quadrant member is secured on the inner side of said enclosing side wall within said upper chamber and extends forwardly from said inner end portion of said inlet pipe to direct the flow of incoming contaminated fluid without damage to said enclosing side wall.

4. A blow-down separator as defined in claim 1 wherein, the cylindrical wall of said discharge member is fully enclosed along its length within said upper chamber except for a peripherally spaced-apart group of open venting portions located a substantial vertical distance above said baffle member, and said open venting portions have substantially planar base portions slanted to an angle to the vertical and facing towards said inlet pipe and have opposed curved connecting portions facing away from said inlet pipe to relieve pressure of the fluid, to only accept portions of substantially pure flash and reject the introduction of condensate therethrough into said discharge member.

5. A blow-down separator as defined in claim 1 wherein, an ejector has a vertical outlet portion positioned centrally within and projecting upwardly along said discharge member and has a horizontal lower inlet end portion projecting from an opening in said cylindrical wall that is substantially vertically-spaced above said baffle member and is positioned substantially 270° from the inner end portion of said inlet pipe, and said ejector has a lip edge on its lower inlet end portion that projects slightly outwardly beyond the outer side of said cylindrical wall at the substantial 270° position and slopes inwardly into said cylindrical wall towards 360° with reference to the inner end portion of said inlet pipe to receive a portion of the inner substantially pure flash from said upper chamber and to reject entrained fluid and to increase the rate of flow of the inner lower density portion of the fluid over said baffle member, through said outlet port portion and said discharge member.

References Cited by the Examiner
UNITED STATES PATENTS

| | | | |
|---|---|---|---|
| 1,055,792 | 3/13 | Plock | 55—435 |
| 1,560,286 | 11/25 | Mount | 55—191 |
| 1,916,528 | 7/33 | Raymond | 55—435 |
| 2,762,451 | 9/56 | McNeil | 55—204 |
| 2,918,139 | 12/59 | Silverman | 55—449 |

REUBEN FRIEDMAN, *Primary Examiner.*

UNITED STATES PATENT OFFICE
CERTIFICATE OF CORRECTION

Patent No. 3,200,568                          August 17, 1965

Dalph C. McNeil

It is hereby certified that error appears in the above numbered patent requiring correction and that the said Letters Patent should read as corrected below.

Column 1, line 22, after "deposit" insert -- on --; line 35, for "and" read -- an --; line 55, for "dscription" read -- description --; column 2, line 31, for "corrosion-resistnat" read -- corrosion-resistant --; column 4, line 39, after "spiral" insert -- flash --; column 6, line 21, for "centrigugal" read -- centrifugal --; line 24, for "siad" read -- said --; column 8, line 3, for "to", first occurrence, read -- at --.

Signed and sealed this 5th day of April 1966.

(SEAL)
Attest:

ERNEST W. SWIDER
Attesting Officer

EDWARD J. BRENNER
Commissioner of Patents